US011979972B2

(12) United States Patent
Hansson et al.

(10) Patent No.: US 11,979,972 B2
(45) Date of Patent: May 7, 2024

(54) X-RAY SOURCE WITH AN ELECTROMAGNETIC PUMP

(71) Applicant: Excillum AB, Kista (SE)

(72) Inventors: Björn Hansson, Kista (SE); Per Takman, Kista (SE); Ulf Lundström, Kista (SE); Tomi Tuohimaa, Kista (SE)

(73) Assignee: EXCILLUM AB, Kista (SE)

( * ) Notice: Subject to any disclaimer, the term of this patent is extended or adjusted under 35 U.S.C. 154(b) by 250 days.

(21) Appl. No.: 17/609,655

(22) PCT Filed: May 7, 2020

(86) PCT No.: PCT/EP2020/062640

§ 371 (c)(1),
(2) Date: Nov. 8, 2021

(87) PCT Pub. No.: WO2020/225334

PCT Pub. Date: Nov. 12, 2020

(65) Prior Publication Data

US 2022/0230832 A1 Jul. 21, 2022

(30) Foreign Application Priority Data

May 9, 2019 (EP) .................................... 19173434
Dec. 19, 2019 (EP) .................................... 19218021

(51) Int. Cl.

*H05G 2/00* (2006.01)
*F04B 15/02* (2006.01)

(Continued)

(52) U.S. Cl.

CPC ............. *H05G 2/006* (2013.01); *F04B 15/02* (2013.01); *F04B 17/03* (2013.01); *F04B 17/04* (2013.01);

(Continued)

(58) Field of Classification Search

CPC ...................................................... H05G 2/006
See application file for complete search history.

(56) References Cited

U.S. PATENT DOCUMENTS 2,905,089 A 9/1959 Reginald
3,302,573 A 2/1967 Louis (Continued)

FOREIGN PATENT DOCUMENTS

EP 0211375 A1 2/1987
EP 2743963 A2 6/2014

(Continued)

OTHER PUBLICATIONS

Office Action (Communication pursuant to Article 94(3) EPC) dated Nov. 25, 2022, by the European Patent Office in corresponding European Application No. 20 723 416.2-1004. (4 pages).

(Continued)

*Primary Examiner* — Chih-Cheng Kao

(74) *Attorney, Agent, or Firm* — BUCHANAN, INGERSOLL & ROONEY PC

(57) ABSTRACT

A liquid metal jet X-ray source including an electromagnetic pump for pumping the liquid metal. The electromagnetic pump includes a core having a core diameter and an outer yoke with a thickness of at least 20% of the core diameter. Preferably, the thickness of the outer yoke is at least 20% of the core diameter plus 6% of a radial distance between an outside of the core and an inside of the yoke.

12 Claims, 9 Drawing Sheets

(51) Int. Cl.
*F04B 17/03* (2006.01)
*F04B 17/04* (2006.01)
*H01J 35/08* (2006.01)

(52) U.S. Cl.
CPC ....... *H01J 35/112* (2019.05); *H01J 2235/082* (2013.01); *H01J 2235/1026* (2013.01)

(56) References Cited

U.S. PATENT DOCUMENTS

| | | | | |
|---|---|---|---|---|
| 4,775,298 | A | 10/1988 | Lauhoff et al. | |
| 4,953,191 | A | 8/1990 | Smither et al. | |
| 5,209,646 | A | 5/1993 | Smither | |
| 2008/0285717 | A1 | 11/2008 | Barschdorf et al. | |
| 2012/0057680 | A1* | 3/2012 | Hemberg | H05G 2/008 378/143 |
| 2012/0146511 | A1* | 6/2012 | Kuwabara | H05G 2/006 315/111.71 |
| 2015/0306620 | A1 | 10/2015 | Faubel et al. | |
| 2019/0131103 | A1 | 5/2019 | Tuohimaa | |
| 2020/0058461 | A1 | 2/2020 | Takman et al. | |
| 2021/0239110 | A1 | 8/2021 | Zoestbergen et al. | |

FOREIGN PATENT DOCUMENTS

| | | | |
|---|---|---|---|
| EP | 2937892 | A1 | 10/2015 |
| GB | 885774 | A | 12/1961 |
| GB | 1052098 | A | 12/1966 |
| GB | 1114979 | A | 5/1968 |
| JP | S 63-174555 | A | 7/1988 |
| JP | 2007-533093 | A | 11/2007 |
| JP | 2019-515623 | A | 6/2019 |
| JP | 2019-525386 | A | 9/2019 |
| JP | 2020-516033 | A | 5/2020 |
| WO | 2010112048 | A1 | 10/2010 |
| WO | 2012087238 | A1 | 6/2012 |
| WO | 2013185829 | A1 | 12/2013 |

OTHER PUBLICATIONS

Office Action (Communication pursuant to Article 94(3) EPC) dated Nov. 25, 2022, by the European Patent Office in corresponding European Application No. 20 723 415.4-1004. (4 pages).

International Search Report (PCT/ISA/210) and Written Opinion (PCT/ISA/237) dated Jun. 4, 2020, by the European Patent Office as the International Searching Authority for International Application No. PCT/EP2020/062640.

Office Action (Notice of Reasons for Refusal) issued on Nov. 24, 2023, by the Japanese Patent Office in corresponding Japanese Patent Application No. 2021-566521, and an English Translation of the Office Action. (12 pages).

International Search Report and Written Opinion (Forms PCT/ISA/210 and PCT/ISA/237) issued on Jun. 4, 2020, by the International Searching Authority in corresponding International Application No. PCT/EP2020/062639. (8 pages).

* cited by examiner

X-RAY SOURCE WITH AN ELECTROMAGNETIC PUMP

TECHNICAL FIELD

The invention disclosed herein generally relates to electromagnetic pumps, and in particular to X-ray sources comprising one or more electromagnetic pumps for pumping an electrically conductive liquid to be used as a target in the X-ray sources.

BACKGROUND

X-rays have traditionally been generated by letting an electron beam impact upon a solid anode target. However, thermal effects in the anode limit the performance of the X-ray source.

One way of mitigating the problems relating to overheating of the solid anode target has been to use a liquid metal jet as electron target in X-ray generation. Liquid metal jet X-ray sources are thus based on generation of X-ray radiation by interaction between an electron beam and a liquid metal jet. By virtue of its regenerative nature, such a jet of liquid metal can withstand strong electron beam impact. An example of such a system is disclosed in WO 2010/112048 A1. In this system, a liquid metal jet is supplied in a closed-loop fashion by means of a pressurizing means, a jet nozzle and a reservoir for collecting the liquid metal at the end of the jet.

However, the use of a liquid metal jet as electron target has been found to entail potential weaknesses. For example, the uniformity of the jet, in terms of speed, shape and thickness (cross-sectional size), may be less than optimal due to pressure variations and insufficiencies caused by the pump used for pressurizing the liquid metal. Further, the pump will typically require regular and time-consuming maintenance, which may lead to increased operational costs and system downtime.

SUMMARY

It is an object of the present invention to address at least some of the above shortcomings. A particular object is to provide an improved electromagnetic pump and an X-ray source comprising such pump.

By way of introduction, the context and some challenges relating to systems for supply of a liquid jet will be briefly discussed.

An X-ray source of the mentioned type may include an electron gun and a system for providing a steady jet of pressurized liquid metal inside a vacuum chamber. The metal used is preferably one having a comparably low melting temperature, such as indium, gallium, tin, lead, bismuth or a mixture or an alloy thereof. The electron gun may function by the principle of cold-field-emission, thermal field-emission, thermionic emission or the like. The system for providing the electron-impact target, i.e., the liquid jet, may include a heater and/or cooler, a pressurizing means, a jet nozzle and a reservoir for collecting the liquid at the end of the jet. X-ray radiation is generated in an impact region as a result of interaction between the electrons and the liquid target. A window having suitable transmission characteristics allows the generated X-ray radiation to be let out from the vacuum chamber. It is generally desirable to recover the liquid in a closed-loop fashion in order to allow continuous operation of the X-ray source.

On a technological level, supply and pressurization of the liquid jet may be challenging. In particular, the pump used for pressurizing and circulating the liquid may be dissatisfactory due to pressure variations caused by for example the movement of pump pistons, or by an insufficient capacity to build up a sufficiently high pressure.

Leakage of liquid, i.e. target material, is another potential challenge. The result of leakage may be that metal is permanently lost to the exterior of the system. Other problems of leakage include occurrence of situations where metal solidifies in part of the system that are difficult or virtually impossible to access. Further, seals, piping and pumps are all source of potential leakage of liquid and therefore weak points of the supply system of the liquid jet. From the point of view of a user, leakage may necessitate expensive replenishment of liquid, shorten maintenance intervals and generally make operation and maintenance of the associated X-ray source more difficult and time consuming. The present invention aims at addressing at least some of these challenges.

The present invention is based on an insight that at least some of the above-mentioned shortcomings of the prior art can be mitigated by using an electromagnetic pump for the target liquid.

While electromagnetic pumps for conductive liquids are known in the prior art, they have not been employed for producing a liquid metal jet for use as a target in an electron beam impact X-ray source. One reason for this is that the prior art electromagnetic pumps are not able to achieve a sufficiently high pressure.

In order to produce a liquid metal jet for use as a target in an electron beam impact X-ray source, the liquid typically needs to be pressurized to above 100 bars. One way of reaching such high pressures could, at least in principle, be to connect a plurality of electromagnetic pumps in series. However, this would lead to an increased occurrence of seals and piping, which constitute points of potential leakage, as discussed above, and would also require additional electrical connections. Therefore, in embodiments of the present invention, an electromagnetic pump is provided in which there are provided a plurality of sections in a single body to successively raise the pressure along the pump to sufficient levels.

Proposed herein, in accordance with a first aspect of the inventive concept, is therefore an electromagnetic pump for pumping an electrically conductive liquid. The pump comprises:

- a first conduit section having an inlet and an outlet,
- a second conduit section having an inlet and an outlet,
- wherein each one of the conduit sections is arranged to provide a flow of the liquid from its inlet to its outlet, and
- wherein the outlet of the first conduit section is fluidly connected to the inlet of the second conduit section.

The pump further comprises:

- a current generator arranged to provide an electric current through the liquid in the first conduit section and the liquid in the second conduit section such that a direction of the electric current intersects the flow of the liquid in the first conduit section and in the second conduit section, and
- a magnetic field generating arrangement arranged to provide a magnetic field passing through the liquid in the first conduit section and the second conduit section such that a direction of the magnetic field intersects the flow of the liquid and the direction of the electric current, wherein the first conduit section and the second conduit section are configured to provide an orientation of the flow of the liquid in the first conduit section that is opposite to an orientation of the flow of the liquid in the second conduit section.

Some embodiments of the present invention may thus include an electromagnetic pump that comprises at least a first and a second section. A first permanent magnet may be arranged in the first section and a second permanent magnet may be arranged in the second section, wherein the first and second permanent magnets are arranged with opposite magnetic field orientations. To achieve a pumping force in the same direction along the liquid metal in both sections, the conduit winding direction in the first section may be opposite the conduit winding direction in the second section. In this way, the electrical current can flow in the same direction through the entire arrangement. It will be appreciated that such arrangement can be extended to any number of sections, wherein the magnetic field orientations and the conduit winding directions are switched accordingly between each section.

The raising of the pressure in the electrically conductive liquid may be achieved by the magnetic force resulting from the interaction between the magnetic field and the electric current flowing through the liquid. The direction of the magnetic force is generally perpendicular to the plane comprising both the direction of the electric current and the magnetic field, and by orienting this plane substantially perpendicular to the length direction of the conduit, a flow of the liquid may be induced through the conduit. The magnetic force on a current carrying conductor may be written as $$d\vec{F}=Id\vec{l}\times\vec{B}$$

In other words, the generated force is perpendicular to both the magnetic field and the electric current and only the components of the field and the current perpendicular to each other contribute to the generated force. The magnetic force, and hence the flow of the liquid, may be affected by the strength of the magnetic field, the current flowing through the liquid, and the length of the conduit over which the magnetic force acts. Further, the strength of the magnetic force may be determined by the angle the magnetic field makes with the direction of the electric current. Preferably, the magnetic field is perpendicular to the direction of the electric current in order to provide a maximum magnetic force. The magnetic field may, for example, be arranged at an angle of between 70 to 110 degrees with respect to the direction of the electric current. Furthermore, the pressure provided by the electromagnetic pump may be proportional to a number of conduit sections arranged in the electromagnetic pump. In the present disclosure, a first and a second conduit section are described. However, it is further envisioned that several conduit sections according to the inventive concept may be arranged consecutively in the electromagnetic pump. Conventional electromagnetic pumps are often designed to provide pressures in the range up to a few tens of bars. The present invention is intended for pumps suitable for providing pressures up to several hundreds of bar such as 200 bar, 350 bar, or 1000 bar.

It is further envisioned that the electromagnetic pump may be configured to pump an electrically conductive fluid. Such an arrangement may have any of the features and advantages disclosed in the present disclosure.

The first conduit section may be configured to provide an orientation of the flow of the liquid that is opposite to the orientation of the flow provided by the second conduit section, while the electric current may maintain substantially the same main direction through both sections. As a result, the magnetic force generated upon the interaction between the magnetic field and the electric current may point in opposite directions between the two sections. This may be compensated by reversing the orientation of the flow of the liquid in the second conduit section, such that the resulting flow may flow through both conduit sections.

The magnetic field generating arrangement may be arranged to provide a magnetic field in the first conduit section that is opposite in direction compared to a magnetic field in the second conduit section, while the electric current may maintain substantially the same main direction through both sections.

In order to fully appreciate the inventive concept, some terms may initially be further clarified.

A main pump direction of the electromagnetic pump may be defined as the vector between the inlet of the first conduit section and the outlet of the second conduit section. The 'orientation' of the flow in a conduit section is thus understood as the orientation of the flow within a conduit of said conduit section, which is not necessarily the same as the main pump direction.

Furthermore, each conduit section may also have a section direction defined as the vector between the inlet of the conduit section and the outlet of the conduit section.

The orientation of the flow of the liquid in the first conduit section being 'opposite' the orientation of the flow of the liquid in the second conduit section may be defined as e.g. a left-handed and right-handed orientation of the flow in the respective conduit sections, such as flow in a left-handed and right-handed spiral or helix respectively. It may also be defined as the section direction in the respective conduit sections being substantially opposed to each other.

An opposite orientation of the flow of the liquid in the respective conduit sections may be achieved by having mirrored sections, i.e. a first conduit section having a first layout, and a second conduit section having a second layout being mirrored with respect to the first layout. It is further envisioned that an opposite orientation of the flow of the liquid in the respective conduit sections may be achieved by reversing the flow direction in substantially identical conduit sections, i.e. a first conduit section having a first layout, and a second conduit section having the first layout, wherein a first opening of the first conduit section serves as an inlet, a second opening of the first conduit section serves as an outlet, and a first opening of the second conduit section, corresponding to the first opening of the first conduit section, serves as an outlet, and a second opening of the second conduit section, corresponding to the second opening of the first conduit section, serves as an inlet.

Throughout the present disclosure, references are made to a "type one" and a "type two" polarity of a magnetic field generator; examples of such types are a south pole and a north pole respectively of a magnetic field generator, such as a north pole and a south pole respectively of a permanent magnet.

Each one of the conduit sections may comprise a conduit for holding the liquid. The conduit may comprise a duct, a tube, and/or a pipe. A tube may be advantageous in that it can be arranged with cross-section being square, rectangular or the like. Such cross-sections may be beneficial for providing the interconnecting arrangement to allow the electric current to travel within each one of the conduit sections. In particular, a rectangular cross-section may provide an interface between the conduits of a conduit section having a relatively large surface area compared to a circular cross-section. On the other hand, a circular cross section pipe may provide for higher mechanical strength for a given wall thickness since the hoop stress will be the same for the entire cross section whereas, for a rectangular cross section, stress concentrations will appear at the corners. The conduit may be formed by assembling at least two machined parts. The conduit may be formed by 3D printing of a suitable electrically conductive material. Preferably, the conduit should be made from a non-magnetic material to ensure that the magnetic field penetrates the liquid that is being pumped. In some embodiments the conduit may comprise a stainless steel tube.

The electrically conducting liquid may be or comprise gallium, indium, tin, lead, bismuth or an alloy thereof.

By the electromagnetic pump according to the inventive concept, a compact pump may be achieved. In particular, the opposite orientation in the respective conduit sections may provide for a more compact arrangement of the magnetic field generating arrangement. In some embodiments, the conduit sections may be associated with respective magnetic field generators. Such magnetic field generators may have opposing polarities between the conduit sections, which may provide for a compact arrangement of the magnetic field generators without a need of intermediate materials between the magnetic field generators for closing the magnetic circuits. The magnetic field generators may be embodied as permanent magnets, such as neodymium magnets.

Furthermore, the electromagnetic pump according to the inventive concept may provide a pump having few (or complete absence of) moving parts compared to conventional pumps for electrically conductive liquid. Hereby, maintenance may be facilitated, and the risk of pressure variations generated by moving parts may be decreased.

Throughout the present disclosure, several examples of conduit sections are disclosed. It is to be understood that further variations of conduit sections are envisioned within the scope of the inventive concept.

The first conduit section may comprise a coil having windings in a first direction, and the second conduit section may comprise a coil having windings in a second direction, the first direction being opposite the second direction.

The electromagnetic pump may further comprise a yoke encasing the first conduit section and the second conduit section, wherein the yoke comprises a ferromagnetic material, such as iron, magnetic steel, or the like. The yoke may be arranged to provide mechanical support. In particular, the yoke may be configured to withstand a pressure generated via the forces acting on the electrically conductive liquid by the electromagnetic pump. The yoke may also provide routing for the magnetic field, i.e. the yoke may provide for that the magnetic flux generated by the magnetic field generating arrangement is confined.

The electromagnetic pump may further comprise a core of a ferromagnetic material. The core may provide closing of the magnetic circuit, i.e. the core may provide a path that the magnetic flux generated by the magnetic field generating arrangement is confined to.

In order to confine the magnetic field, as discussed in more detail below, the outer yoke may have a thickness of at least 20% of the diameter of the core. Preferably, taking into account also that there is typically a gap between the core and the yoke, the thickness of the yoke may be at least 20% of the diameter of the core plus 6% of the radial distance between the core and the yoke. With such thickness of the yoke, the magnetic field is substantially confined within the electromagnetic pump so that interference with the electron beam of the X-ray source is practically eliminated.

The outlet of the first conduit section may be fluidly connected to the inlet of the second conduit section by means of an intermediate reservoir formed by an inner wall and an outer wall of the electromagnetic pump. The inner wall may be the core of the electromagnetic pump discussed above. The outer wall may be the yoke of the electromagnetic pump discussed above. It is also envisioned that the inner and/or outer wall may be formed by the magnetic field generating arrangement. Furthermore, it is envisioned that the electromagnetic pump may comprise separate elements providing the inner and/or outer wall forming the intermediate reservoir. The intermediate reservoir may be further formed by at least part of the first conduit section and at least part of the second conduit section. By providing an intermediate reservoir, a simple fluid connection between the first and the second conduit sections may be achieved.

The outlet of the first conduit section and the inlet of the second conduit section may be part of one and the same structure, i.e. the first conduit section and the second conduit section may be a single part.

The outlet of the first conduit section may be fluidly connected to the inlet of the second conduit section by means of an intermediate conduit. Hereby, a simple fluid connection between the first and the second conduit sections may be achieved.

The electromagnetic pump may be further configured to allow the electric current to pass from the first conduit section to the second conduit section. This may be achieved at least partly by means of e.g. the intermediate reservoir discussed above. The electrically conductive liquid may fill the intermediate reservoir and conduct the electric current from the first conduit section to the second conduit section. It is also envisioned that the electromagnetic pump may comprise an intermediate conducting element, such as an electrically conducting cuff as will be described below. The intermediate conducting element may be arranged to conduct the electric current from the first conduit section to the second conduit section.

Each one of the conduit sections may comprise a liquid path and an interconnecting arrangement configured to allow the electric current to travel, within each one of the conduit sections and from the inlet to the outlet of each one of the conduit sections, a distance being shorter than the liquid path. The liquid path may be defined by the geometry of the conduit, i.e. a travel path along the conduit, along which the liquid is flowing. In contrast, the electric current is not restricted to travelling along the liquid path owing to the interconnecting arrangement. The interconnecting arrangement may comprise a direct contact between different parts of a conduit of a conduit section, and/or a contact between different parts of the conduit of a conduit section achieved by e.g. soldering or brazing. It is further envisioned that the conduit may comprise an inner surface treated with an etchant. The inner surface of the conduit is the surface intended to contact the liquid. By treating the inner surface with an etchant, an interface between the conduit and the liquid for the purpose of conducting electric current may be improved. The interconnecting arrangement may comprise or be of a conductive material, such as metal, such as copper. In further embodiments the interconnecting arrangement may be provided to fill the space between conduit sections and the surrounding walls, thus providing both for electrical contact and mechanical support.

The magnetic field generating arrangement may comprise a permanent magnet. It is further envisioned that the magnetic field may be provided by means of for example an electromagnet. The present inventive concept provides a technology that allows for a plurality of magnetic field generators to be combined in a space efficient manner. Furthermore, the magnetic field generating arrangement may comprise a magnetic field generator associated with each conduit section, wherein each respective magnetic field generator comprises a plurality of magnetic field generating elements. Such magnetic field generating elements may for example represent a sector, i.e. part of a circumference of a conduit section with respect to the main axis.

The electromagnetic pump may further comprise an electrically conducting cuff arranged between the first conduit section and the second conduit section for allowing the electric current to travel from the first conduit section to the second conduit section. Hereby, electric routing of the electromagnetic pump may be facilitated, since the electric current can pass between the conduit sections and no separate routing to each conduit section is necessary. The electrically conducting cuff may comprise an open section, allowing a fluid connection from the outlet of the first conduit section to the inlet of the second conduit section.

The first conduit section and the second conduit section may be consecutively arranged along a main axis. The main axis may coincide with the main pump direction defined earlier in the present disclosure. Furthermore, the main axis may be a longitudinal axis of the electromagnetic pump. The first conduit section and the second conduit section being consecutively arranged may be understood as the conduit sections being arranged in series along the main axis. Furthermore, the first conduit section and the second conduit section may be centered about the main axis.

The first conduit section may comprise a first coil wound in a first direction around the main axis, and the second conduit section may comprise a second coil wound in a second direction around the main axis, the second direction being opposite the first direction. In other words, the first conduit section may comprise a first helix wound in a first direction around the main axis, i.e. being either of a right-handed and left-handed helix, and the second conduit section may comprise a second helix wound in a second direction around the main axis, i.e. being the other of a right-handed and left-handed helix.

Neighboring turns of the first and second coils respectively may be in electrical contact with each other. Hereby, the electric current may travel through each conduit section.

The magnetic field generating arrangement may comprise a first magnetic field generator arranged to at least partially enclose the first conduit section, and a second magnetic field generator arranged to at least partially enclose the second conduit section, wherein the first magnetic field generator is arranged with a type one magnetic pole facing radially towards the first conduit section and a type two magnetic pole facing radially away from the first conduit section, and wherein the second magnetic field generator is arranged with the type one magnetic pole facing radially away from the second conduit section and the type two magnetic pole facing radially towards the second conduit section, the type one and type two magnetic poles being opposite magnetic poles. These features will be further described in conjunction with FIGS. 2 and 3.

The magnetic field generating arrangement may comprise a first magnetic field generator arranged on an inlet side of the first conduit section, wherein the first magnetic field generator is arranged with a type one magnetic pole facing axially towards the first conduit section and a type two magnetic pole facing axially away from the first conduit section, and a second magnetic field generator arranged on an outlet side of the first conduit section and an inlet side of the second conduit section, wherein the second magnetic field generator is arranged with the type one magnetic pole facing axially towards the first conduit section and the type two magnetic pole facing axially towards the second conduit section, the type one and type two magnetic poles being opposite magnetic poles.

Neighboring turns of the first and second coils respectively may be in electrical contact with each other. Hereby, the electric current may travel through each conduit section. These features will be further described in conjunction with FIG. 4.

The first conduit section may comprise a first spiral shape arranged substantially transverse to the main axis, and wherein the second conduit section comprises a second spiral shape arranged substantially transverse to the main axis. The first spiral shape and the second spiral shape may be arranged in a single plane respectively.

The magnetic field generating arrangement may comprise a first magnetic field generator arranged on an inlet side of the first conduit section, wherein the first magnetic field generator is arranged with a type one magnetic pole facing axially towards the first conduit section and a type two magnetic pole facing axially away from the first conduit section, and a second magnetic field generator arranged on an outlet side of the first conduit section and an inlet side of the second conduit section, wherein the second magnetic field generator is arranged with the type one magnetic pole facing axially towards the second conduit section and the type two magnetic pole facing axially towards the first conduit section, the type one and type two magnetic poles being opposite magnetic poles. These features will be further described in conjunction with FIG. 6.

According to a second aspect, an electromagnetic pump for pumping an electrically conductive liquid is provided, which may be similarly configured as the electromagnetic pump disclosed above in connection with the first aspect and embodiments. However, it should be appreciated that the pump according to the present aspect differ in that it may comprise a single conduit section, and thus not necessarily two or more conduit sections. Similar to the first aspect and embodiments, the electromagnetic pump may comprise a current generator arranged to provide an electric current through the liquid in the conduit section such that a direction of the electric current is intersecting the flow of the liquid in the conduit section, and further a magnetic field generating arrangement arranged to provide a magnetic field passing through the liquid in the conduit section such that a direction of the magnetic field is intersecting the flow of the liquid and the direction of the electric current.

In some embodiments, the electromagnetic pump according to the first or second aspects may be configured to allow a fluid to be present between the conduit section(s) and an inner surface of an outer wall of the electromagnetic pump. Thus, fluid may be present outside of the conduit to balance the pressure that the liquid inside the conduit exerts on the conduit walls. Advantageously, this balancing of the pressure difference over the conduit wall allows for the pump to operate at liquid pressures that otherwise would risk damaging the conduit section. Put differently, the liquid outside the conduit section allows for the wall thickness of the conduit section to be reduced, since the wall section is exposed to a lower pressure difference.

The fluid may for example be formed of the electrically conductive liquid that is pumped through the electromagnetic pump, and may in an example be provided by means of a fluid connection between the inside of the conduit and the space between the conduit and the surrounding outer wall. This fluid connection may for example be provided via an intermediate reservoir formed by an inner wall and the outer wall of the electromagnetic pump, as discussed above. Provided that the space between the conduit and the surrounding walls forms an open connection from the inlet of the conduit section to the outlet, the fluid flowing on the outside of the conduit may be seen as a parallel flow for liquid being pumped. If an electrical current is passed through the fluid, a pumping force will be exerted also on this fluid.

It is also conceivable within the scope of the invention to provide a different liquid outside of the conduit section. In such case, measures that prevent mixing of the two liquids may be provided. In further embodiments, the space between the conduit section and the surrounding inner walls may be filled with an incompressible potting compound, e.g. an epoxy.

According to a third aspect of the inventive concept, there is provided an X-ray source comprising: a liquid target generator configured to form a liquid target of an electrically conductive liquid; an electron source configured to provide an electron beam interacting with the liquid target to generate X-ray radiation; and an electromagnetic pump according to any of the above-described aspects of the inventive concept.

For practical reasons, such as to avoid losses and feed throughs in radiation shields and vacuum enclosures, the pump should preferably be located close to, or even inside, the vacuum chamber. Such placement of an electromagnetic pump could lead to interference with the electron beam. In embodiments of the present invention, interference from the electromagnetic pump with the electron beam is reduced or even eliminated by using an electromagnetic pump that has a yoke for the magnetic circuit of a sufficient thickness to prevent magnetic leakage. To this end, a liquid metal jet X-ray source may be provided wherein the thickness of the outer yoke may be at least 20% of the diameter of the core, and preferably at least 20% of the core diameter plus 6% of the radial distance between the core and the yoke. Both the core and the yoke are preferably made of the same ferromagnetic material, such as iron, magnetic steel, or the like. The X-ray source may comprise a closed-loop circulation system, such as a recirculating path, in which the electromagnetic pump is incorporated. Furthermore, the X-ray source may comprise a collection reservoir for collecting the liquid being ejected from the liquid target generator.

Depending on the properties of the liquid metal used for target material, the electromagnetic pumps described above may have to operate at different temperatures. Two non-limiting examples may be gallium with a melting point of 30° C. and indium with a melting temperature of 157° C. To avoid losing performance at higher temperatures, any parts of the magnetic circuit not comprising magnetic material should be kept as small as possible. In other words, a gap between the magnetic poles should be made narrow. However, since the conduit transporting the liquid metal is typically present in this gap, the pump capacity will be reduced if the width of the gap is reduced. To resolve this, a liquid metal jet X-ray source comprising a suitably designed electromagnetic pump may be provided. The electromagnetic pump may comprise a hollow cylindrical radially magnetized permanent magnet with an outer first diameter and an inner second diameter, a cylindrical core with a third diameter arranged concentrically with said permanent magnet wherein the distance between the inner diameter of the magnet and the diameter of the core is less than the product of the third diameter and the difference between the first and the second diameter divided by sum of the first and the second diameter. The X-ray source may also incorporate a yoke for the magnetic circuit of a sufficient thickness to prevent magnetic leakage. Furthermore, the electromagnetic pump may comprise a plurality of sections to achieve desired pump performance.

Several modifications and variations are possible within the scope of the third aspect. In particular, X-ray sources and systems comprising more than one liquid target, or more than one electron beam are conceivable within the scope of the present inventive concept. Furthermore, X-ray sources of the type described herein may advantageously be combined with X-ray optics and/or detectors tailored to specific applications exemplified by but not limited to medical diagnosis, non-destructive testing, lithography, crystal analysis, microscopy, materials science, microscopy surface physics, protein structure determination by X-ray diffraction, X-ray photo spectroscopy (XPS), critical dimension small angle X-ray scattering (CD-SAXS), and X-ray fluorescence (XRF).

Additionally, variation to the disclosed examples can be understood and effected by the skilled person in practicing the claimed invention, from a study of the drawings, the disclosure, and the appended claims. The mere fact that certain measures are recited in mutually different dependent claims does not indicate that a combination of these measures cannot be used to advantage.

A feature described in relation to one aspect may also be incorporated in other aspects, and the advantage of the feature is applicable to all aspects in which it is incorporated.

Other objectives, features and advantages of the present inventive concept will appear from the following detailed disclosure, from the attached claims as well as from the drawings.

Generally, all terms used in the claims are to be interpreted according to their ordinary meaning in the technical field, unless explicitly defined otherwise herein. Further, the use of terms “first”, “second”, and “third”, and the like, herein do not denote any order, quantity, or importance, but rather are used to distinguish one element from another. All references to “a/an/the [element, device, component, means, step, etc.]” are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present inventive concept, will be better understood through the following illustrative and non-limiting detailed description of different embodiments of the present inventive concept, with reference to the appended drawings, wherein.

The figures are not necessarily to scale, and generally only show parts that are necessary in order to elucidate the inventive concept, wherein other parts may be omitted or merely suggested.

DETAILED DESCRIPTION

Figure 1:
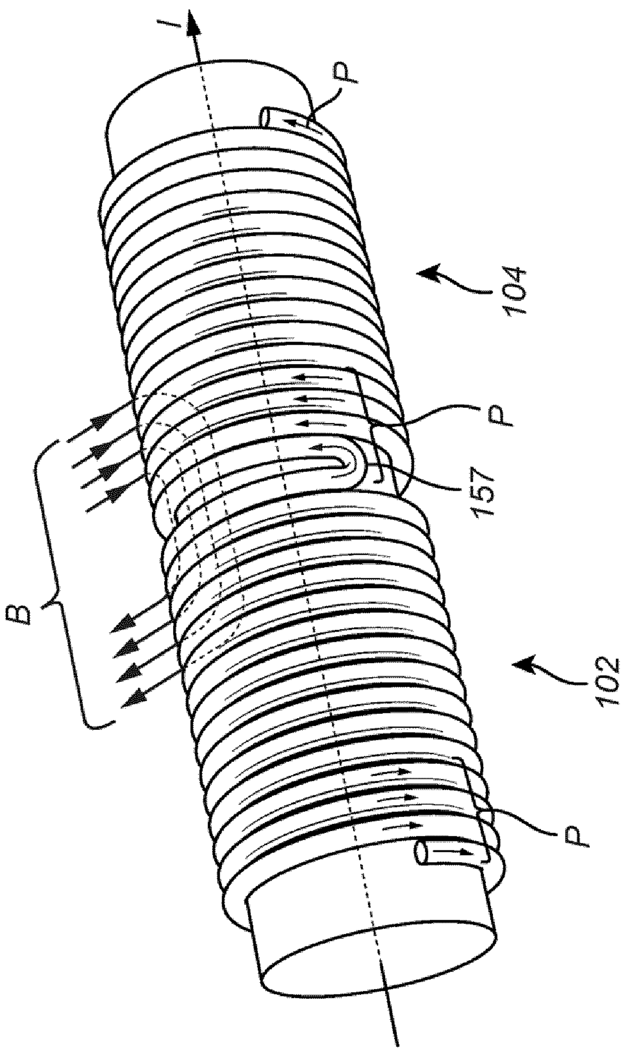
FIG. 1 schematically illustrates a first conduit section and a second conduit section.

Referring to FIG. 1, a first conduit section 102 and a second conduit section 104 are illustrated. The first conduit section 102 here comprises a tube or pipe, and is arranged as a right-handed helix, and the second conduit section 104 here comprises a tube or pipe, and is arranged as a left-handed helix. The first conduit section 102 may be fluidly connected to the second conduit section via an intermediate conduit 157. The direction of a magnetic field B generated by a magnetic field generating arrangement (not shown), a current direction I, and a flow direction P within each conduit section are illustrated. As can be seen, a direction of the magnetic field B, the current direction I, and the flow direction P, are all mutually orthogonal.

Figure 2:
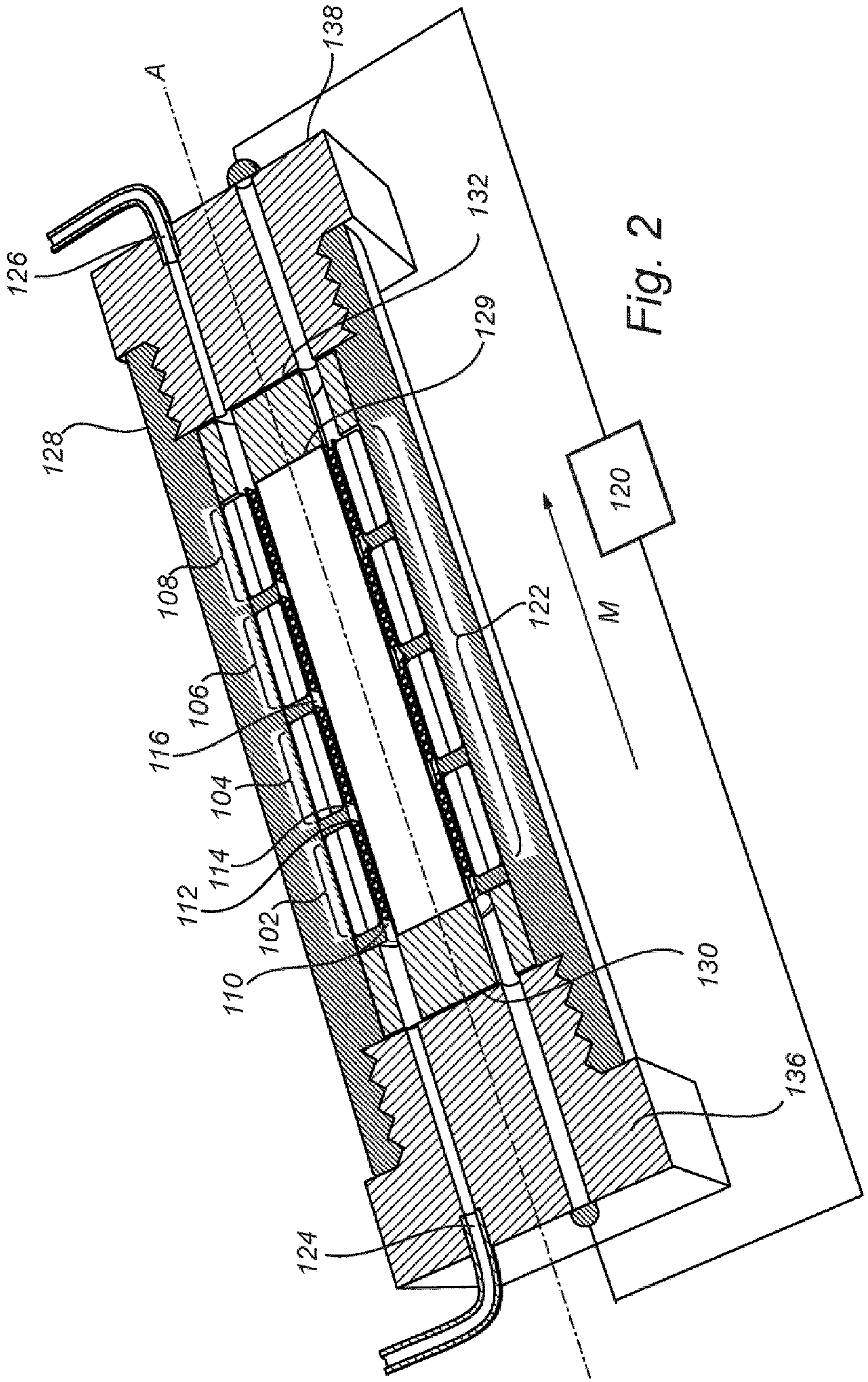
FIG. 2 schematically illustrates an electromagnetic pump in a cross-sectional view.

FIG. 2 illustrates an electromagnetic pump for pumping an electrically conductive liquid 100 in a cross-sectional view along a main axis A of the electromagnetic pump 100. The electromagnetic pump 100 here comprises four conduit sections 102, 104, 106, 108. It is however to be understood that the electromagnetic pump 100 may comprise at least a first conduit section 102 having an inlet 110 and an outlet 112, and a second conduit section 104 having an inlet 114 and an outlet 116, wherein each one of the conduit sections 102, 104 is arranged to provide a flow of the liquid from its inlet to its outlet. The outlet 112 of the first conduit section 102 is further fluidly connected to the inlet 114 of the second conduit section 104. The further conduit sections 106, 108 illustrated in this embodiment may be seen as a repeat of the first and second conduit sections 102, 104, i.e. subsequent to the first and second conduit sections 102, 104, yet another first and second conduit section 106, 108 are arranged. The terms "first conduit section" and "second conduit section" may in this regard be seen as a reference to a type of conduit section, rather than a specific conduit section.

The electromagnetic pump 100 further comprises a current generator 120 arranged to provide an electric current through the liquid in the first conduit section 102 and the liquid in the second conduit section 104 such that a direction of the electric current is substantially perpendicular to the flow of the liquid in the first conduit section 102 and in the second conduit section 104. The direction of the electric current and the flow of the liquid in the conduit sections are more clearly illustrated in FIG. 3. It should be noted that the current generator 120 may be connected to other points than illustrated in FIG. 2.

The electromagnetic pump 100 further comprises a magnetic field generating arrangement 122 arranged to provide a magnetic field passing through the liquid in the first conduit section 102 and the second conduit section 104 such that a direction of the magnetic field is substantially perpendicular to the flow of the liquid and the direction of the electric current. Similarly to the above, the direction of the magnetic field is more clearly illustrated in FIG. 3.

The first conduit section 102 and the second conduit section 104 are configured to provide an orientation of the flow of the liquid in the first conduit section 102 that is opposite to an orientation of the flow of the liquid in the second conduit section 104.

Further, the electromagnetic pump 100 may comprise a main inlet 124 and a main outlet 126 for respectively receiving and ejecting the liquid. Further, a yoke 128 encasing the first conduit section 102 and the second conduit section 104 may be comprised by the electromagnetic pump 100. The yoke 128 comprises a ferromagnetic material. Further, the yoke 128 here comprises end pieces 130, 132, arranged, respectively, before the first conduit section of the electromagnetic pump 100, here being the first conduit section 102, and after the last conduit section of the electromagnetic pump 100, here being the second conduit section 108. The terms "before" and "after" in this regard are made with respect to a main flow direction M, defined by a flow vector between the main inlet 124 and the main outlet 126. In particular, the term "before" may be interchangeable by the term "upstream", and the term "after" may be interchangeable by the term "downstream". The end pieces 130, 132 of the yoke may provide routing of the magnetic field. A core 129 is also arranged in the electromagnetic pump 100. The magnetic field may thus go from the inner pole of the magnetic field generator 122, pass radially through the conduit of the first conduit section 102, go through the core 129, the end piece 130, and the yoke 128 into the outer pole of the magnetic field generator, thus completing a closed magnetic circuit.

The electromagnetic pump 100 may further comprise lids 136, 138 configured to be connected to the yoke 128. The lids 136, 138 may provide mechanical support and feed-throughs for the electrically conductive liquid 124, 126 and the current I. In particular, the lids 136, 138 may be configured to withstand a pressure generated via the forces acting on the electrically conductive liquid by the electromagnetic pump 100.

Figure 3:
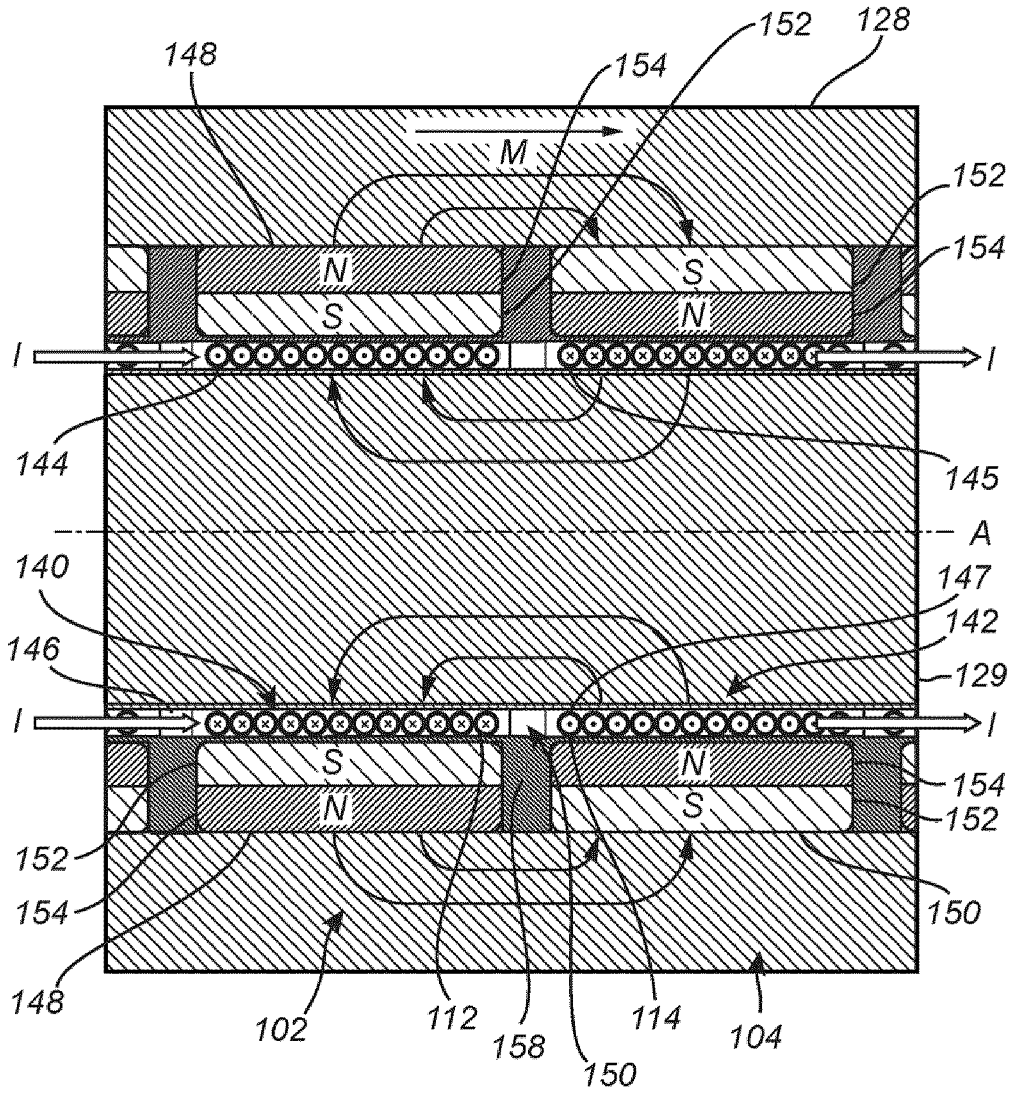
FIG. 3 schematically illustrates an embodiment of a first conduit section and a second conduit section in a cross-sectional view.

Referring now to FIG. 3, a first conduit section 102 and a second conduit section 104 are illustrated in a cross-sectional view. A main flow direction is here indicated by the direction M in the figure. The main axis A is also indicated. The first conduit section 102 and the second conduit section 104 are here consecutively arranged along the main axis A.

The first conduit section 102 comprises a first coil 140 wound in a first direction around the main axis A, and the second conduit section 104 comprises a second coil 142 wound in a second direction around the main axis, the second direction being opposite the first direction. In other words, the first conduit section 102 comprises a first coil 140 being either of a right-handed and left-handed coil, and the second conduit section 104 comprises a second coil 142 wound in a second direction around the main axis, i.e. being the other of a right-handed and left-handed coil. From the illustrated cross-section, the specific orientation of the conduit sections 102, 104, i.e. whether they are left-handed or right-handed coils, cannot be deduced. In contrast, what is of relevance is that the first and second conduit section 102, 104 respectively have opposite orientation.

In the illustrated cross-section, the flow of liquid in the first conduit section 102 is indicated by flow directions 144 and 146, while the flow direction in the second conduit section 104 is indicated by flow directions 145 and 147; the flow propagates either out of (indicated by points) or into (indicated by crosses) the illustrated plane.

A direction of an electric current I through the liquid in the first conduit section 102 and the second conduit section 104 is indicated, the direction of the electric current I being substantially perpendicular to a flow of the liquid in the first conduit section 102 and in the second conduit section 104.

The electromagnetic pump 100 further comprises a magnetic field generating arrangement, which here comprises a first magnetic field generator 148 arranged to at least partially enclose the first conduit section 102, and a second magnetic field generator 150 arranged to at least partially enclose the second conduit section 104, wherein the first magnetic field generator 148 is arranged with a type one magnetic pole 152 (in this example the south pole S) facing radially towards the first conduit section 102 and a type two magnetic pole 154 (in this example the north pole N) facing radially away from the first conduit section 102, and wherein the second magnetic field generator 150 is arranged with the type one magnetic pole 152 (in this example the south pole S) facing radially away from the second conduit section 104 and the type two magnetic pole 154 (in this example the north pole N) facing radially towards the second conduit section 104, the type one and type two magnetic poles 152, 154 being opposite magnetic poles. Owing to the arrangement of the first and second magnetic field generators 148, 150, the magnetic field generated by the respective magnetic field generators 148, 150 are mutually closed by means of each other.

A magnetic circuit provided by respective magnetic field generators 148, 150 passes through the liquid in the first conduit section 102 and the second conduit section 104 respectively such that a direction of the magnetic field is substantially perpendicular to the flow of the liquid and the direction of the electric current I.

The yoke 128 encasing the first conduit section 102 and the second conduit section 104, as well as the core 129 are also visible in the illustrated cross-section.

An intermediate reservoir 156 is fluidly connected to the outlet 112 of the first conduit section and the inlet 114 of the second conduit section 104. The intermediate reservoir 156 is here formed by the core 129, an outer wall 158, and at least part of the first conduit section 102 and at least part of the second conduit section 104. The electrically conductive liquid (not illustrated) may thus flow from the first conduit section 102, via the intermediate reservoir 156, into the second conduit section 104. The electrically conductive liquid being located in the intermediate reservoir 156 may also serve to pass the electric current I from the first conduit section 102 to the second conduit section 104. It is further envisioned that an intermediate conducting element, such as an electrically conducting cuff (not illustrated) may be arranged between the first and second conduit sections 102, 104. The intermediate conducting element may extend around the main axis A, thus increasing a contact area between the intermediate conducting element and the first and second conduit section 102, 104 respectively. One embodiment of such an intermediate conducting element may be represented by an open cuff, wherein the opening in the cuff forms part of the intermediate reservoir 156.

The outer wall 158 may be electrically insulating, and/or made from an electrically insulating material.

Each conduit section 102, 104 may further comprise an interconnecting arrangement. The interconnecting arrangement may be configured to allow the electric current to travel within each one of the conduit sections. In particular, the interconnecting arrangement may be configured to allow the current to travel in a direction being perpendicular to the flow direction within each conduit section. The interconnecting arrangement may be configured to conduct electrical current.

Figure 4:
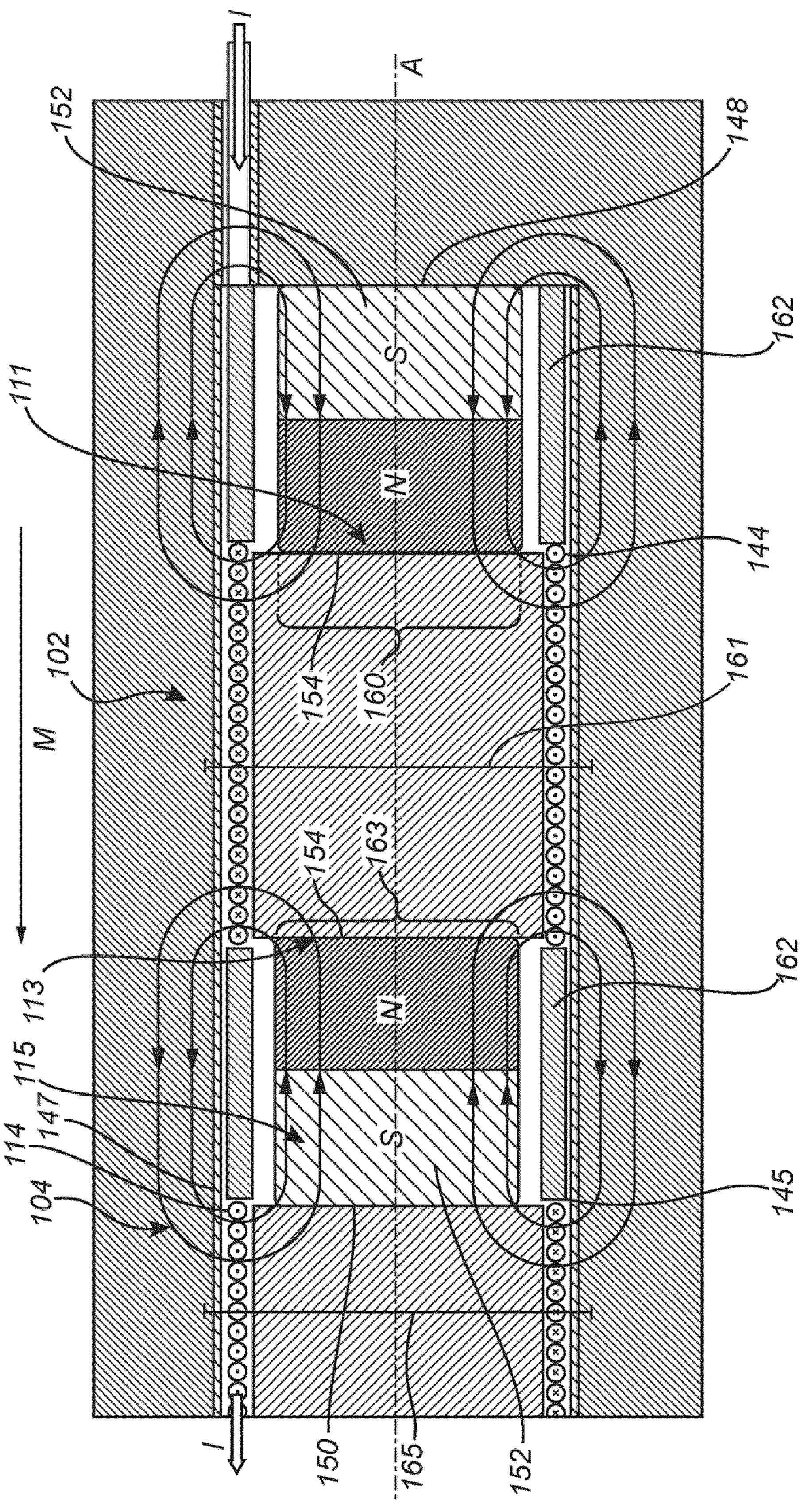
FIG. 4 schematically illustrates a further embodiment of a first conduit section and a second conduit section in a cross-sectional view.

Referring now to FIG. 4, a similar arrangement as described in conjunction with FIG. 3 is shown. For the sake of avoiding repetition of already discussed features, like elements between the embodiments described in conjunction with FIGS. 2, 3 and 4 will not be further discussed in the following sections. The main flow direction is indicated by the direction M.

The magnetic field generating arrangement here comprises a first magnetic field generator 148 arranged on an inlet side 111 of the first conduit section 102, arranged with a type two magnetic pole 154 facing axially towards the first conduit section 102 and a type one magnetic pole 152 facing axially away from the first conduit section 102. A second magnetic field generator 150 is arranged on an outlet side 113 of the first conduit section 102 and an inlet side 115 of the second conduit section 104, wherein the second magnetic field generator 150 is arranged with the type two magnetic pole 154 facing axially towards the first conduit section 102 and the type one magnetic pole 152 facing axially towards the second conduit section 104, the type one and type two magnetic poles 152, 154 being opposite magnetic poles. The term "axially" is here referring to the main axis A. Further, the first magnetic field generator 148 is here a cylinder having a first diameter 160 being smaller than a first coil diameter 161 of the coil of the first conduit section 102. Similarly, the second magnetic field generator 150 is a cylinder having a second diameter 163 being smaller than a second coil diameter 165 of the coil of the second conduit section 104.

The first magnetic field generator 148 is arranged to provide a magnetic field passing through the liquid in the first conduit section 102 such that a direction of the magnetic field is substantially perpendicular to the flow of the liquid and the direction of the electric current I. The second magnetic field generator 150 is arranged to provide a magnetic field passing through the liquid in the second conduit section 104 and the liquid in the first conduit section 102 such that a direction of the magnetic field is substantially perpendicular to the flow of the liquid and the direction of the electric current I.

In the illustrated cross-section, the flow of liquid in the first conduit section 102 is indicated by flow directions 144 and 146, while the flow direction in the second conduit section 104 is indicated by flow directions 145 and 147; the flow propagates either out of (indicated by points) or into (indicated by crosses) the illustrated plane.

Magnetic field circuit lines are illustrated in FIG. 4, and the magnetic field provided by the respective magnetic field generators 148, 150 passes through the liquid in the first conduit section 102 and the second conduit section 104 respectively such that a direction of the magnetic field is substantially perpendicular to the flow of the liquid and the direction of the electric current I.

An intermediate conducting element 162, for example an electrically conducting cuff, is arranged between the first and second conduit sections 102, 104. The intermediate conducting element 162 is here also arranged before the first conduit section 102. The intermediate conducting element 162 may extend around the main axis A, thus increasing a contact area between the intermediate conducting element 162 and the first and second conduit section 102, 104 respectively.

The outlet 112 of the first conduit section 102 may be fluidly connected to the inlet 114 of the second conduit section 104 by means of an intermediate reservoir as described in conjunction with FIG. 3, and/or by an intermediate conduit (not shown). The intermediate conduit may extend substantially the same distance from the main axis A as the first and second conduit sections.

Figure 5A:
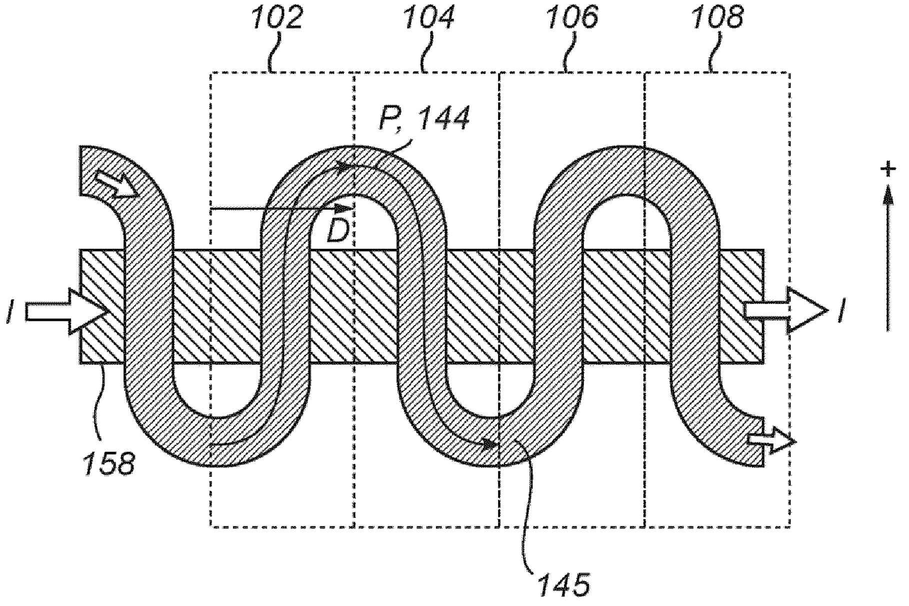
FIGS. 5*a* and 5*b* schematically illustrate a further embodiment of a first conduit section and a second conduit section in cross-sectional views.
Figure 5B:
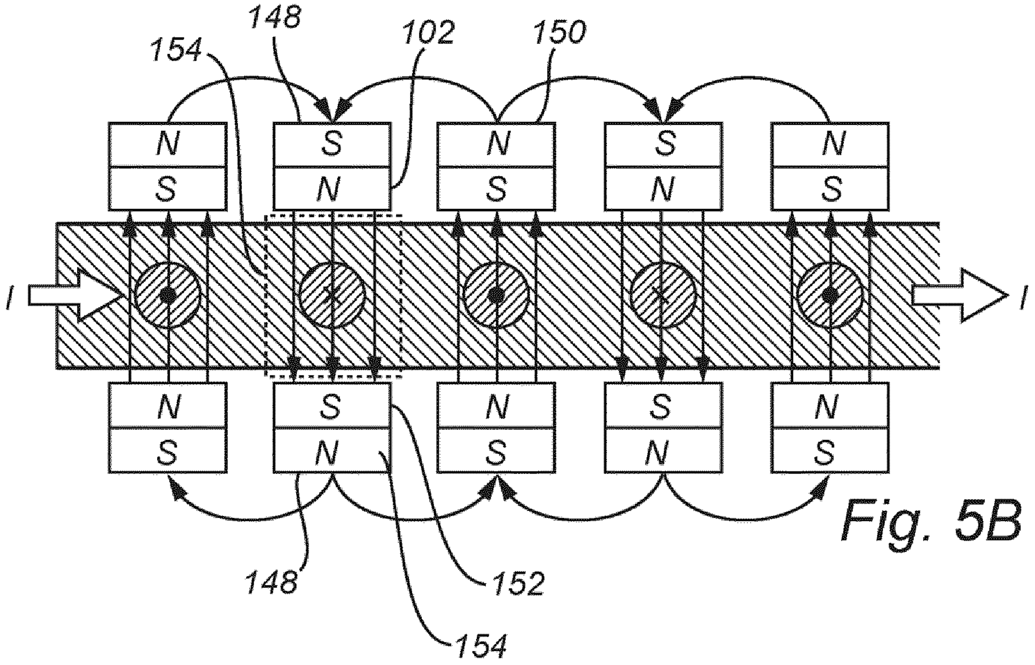

Referring now to FIGS. 5*a* and 5*b*, a further embodiment of a first and a second conduit section 102, 104 is illustrated. For the sake of clarity, some parts of the electromagnetic pump are here omitted from the illustration. It should be noted that the illustrated figures are merely schematic and not necessarily to scale.

Referring first to FIG. 5*a*, a cross-sectional view illustrates several conduit sections 102, 104, 106, 108. An interconnecting arrangement 158 is arranged to allow the electric current I to travel, within each one of the conduit sections 102, 104, 106, 108 and from the inlet to the outlet of each one of the conduit sections, a distance being shorter than the liquid path. The liquid path of a first conduit section 102 is here illustrated by the path P, and the distance of travel of the electric current from the inlet to the outlet of the first conduit section 102 is indicated by the distance D. Each conduit section in the illustrated embodiment may have a meander shape.

The flow of the liquid in the first conduit section 102 is here indicated by flow direction 144. For the sake of clarity, a positive direction is also indicated by an arrow with a (+)-sign. It can thus be seen that the flow of the liquid in the first conduit section 102 substantially follows the positive direction. The flow of the liquid in the second conduit section 104 is indicated by flow direction 145. The orientation of the flow in the second conduit 104 is opposite the orientation of the flow in the first conduit 102, i.e. the flow direction 145 in the second conduit section 104 is substantially opposite the indicated positive direction. This arrangement and resulting flow is partially made possible by the arrangement of the magnetic field generating arrangement, which will be further described in conjunction with FIG. 5*b*.

Referring now to FIG. 5*b*, a cross-sectional view of the further embodiment of the first and second conduit section 102, 104 is illustrated. The cross-sectional view is perpendicular to the cross-sectional view illustrated in conjunction with FIG. 5*a*.

Several conduit sections are here illustrated. Each conduit section is associated with a respective magnetic field generator. For example, a first magnetic field generator 148 is arranged to at least partially enclose the first conduit section 102. The first magnetic field generator 148 is arranged with the type one and two magnetic poles 152, 154 such that magnetic field circuit pass through the conduit and the liquid in the conduit substantially perpendicular to a direction of the electric current I. Furthermore, the arrangement of the magnetic field generators 148, 150 may serve to close the magnetic field circuit between the two magnetic field generators.

Figure 6:
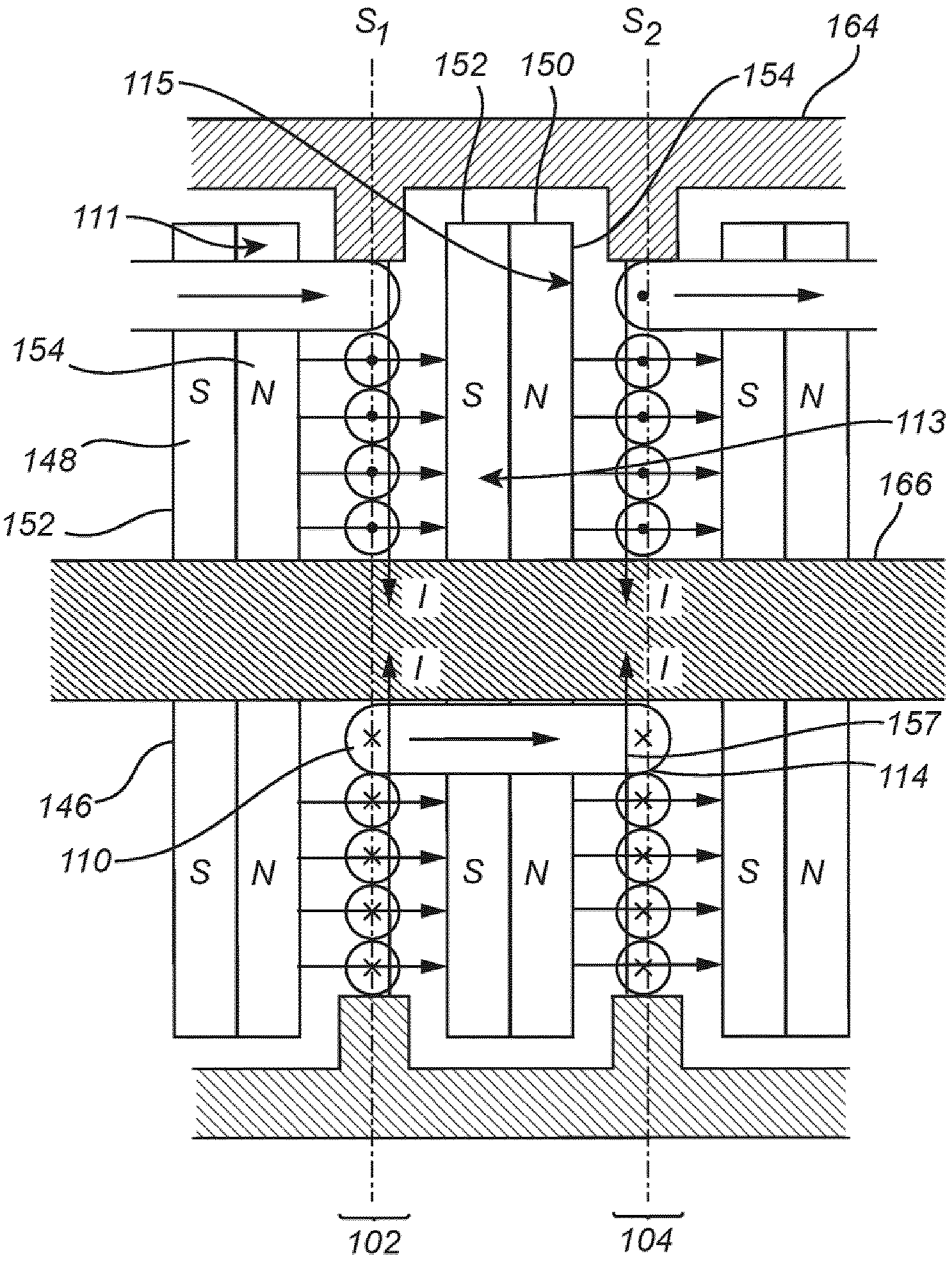
FIG. 6 schematically illustrates a further embodiment of a first conduit section and a second conduit section in a cross-sectional view.

Referring now to FIG. 6, a further embodiment of a first and a second conduit section 102, 104 is illustrated. For the sake of clarity, some parts of the electromagnetic pump are here omitted from the illustration. It should be noted that the illustrated figures are merely schematic and not necessarily to scale.

Each conduit section in the illustrated embodiment may be formed as a spiral shape in a single plane. For example, a first conduit section 102 may be formed as a spiral shape in a single plane $S_1$, and a second conduit section 104 may be formed as a spiral shape in a single plane $S_2$. The first and second conduit sections 102, 104 preferably have the same orientation, i.e. being both either clockwise or counter-clockwise turning spirals. However, the orientation of the flow of the liquid in the first and second conduit sections 102, 104 respectively is opposite in that it flows from an outer part of the first conduit section 102, radially towards an inner part of the first conduit section 102, and from an inner part of the second conduit section 104, radially towards an outer part of the second conduit section 104.

Further, an outer electric current conductor 164 and an inner electric current conductor 166 is here provided. The electric current I is directed from the outer electric current conductor 164, via the conduit sections and optionally interconnecting arrangements configured to allow the electric current to travel within each conduit section, to the inner electric current conductor 166. The electric current hereby passes from one side of a conduit, via the electrically conducting liquid, to an opposite side of the conduit, and further to a nearby part of the conduit, optionally via an interconnecting arrangement.

A magnetic field generating arrangement may comprise a first magnetic field generator 148 arranged on an inlet side 111 of the first conduit section 102, wherein the first magnetic field generator 148 is arranged with a type two magnetic pole 154 facing axially towards the first conduit section 102 and a type one magnetic pole 152 facing axially away from the first conduit section 102, and a second magnetic field generator 150 arranged on an outlet side 113 of the first conduit section 102 and an inlet side 115 of the second conduit section 104, wherein the second magnetic field generator 150 is arranged with the type two magnetic pole 154 facing axially towards the second conduit section 104 and the type one magnetic pole 152 facing axially towards the first conduit section 102, the type one and type two magnetic poles being opposite magnetic poles.

An intermediate conduit 157 is here arranged between the first conduit section 102 and the second conduit section 104, wherein the intermediate conduit 157 provides a fluid connection between the outlet 112 of the first conduit section 102 and the inlet 114 of the second conduit section 104.

Figure 7:
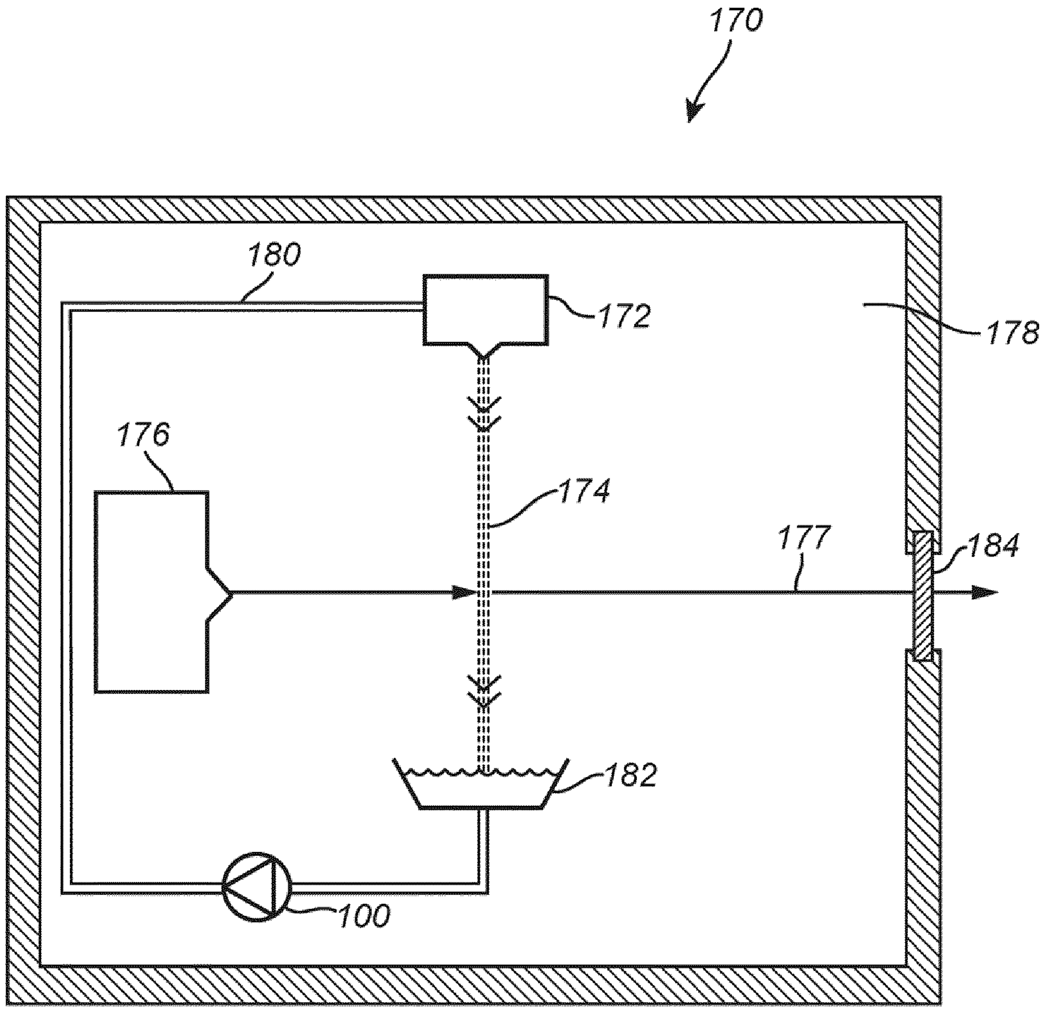
FIG. 7 schematically illustrates an X-ray source comprising an electromagnetic pump.

Referring now to FIG. 7, which illustrates an X-ray source 170 comprising: a liquid target generator 172 comprising a nozzle configured to form a liquid target 174 of an electrically conductive liquid; an electron source 176 configured to provide an electron beam interacting with the liquid target 174 to generate X-ray radiation 177; and an electromagnetic pump 100 according to the inventive concept. The liquid target 174 may be a liquid jet. Accordingly, the electromagnetic pump 100 of the inventive concept may be configured and/or suitable to provide a liquid jet. The X-ray source 170 may further comprise a low pressure chamber 178, or vacuum chamber 178. A recirculating path 180 may also be arranged in liquid connection with a collection reservoir 182 for collecting the liquid being ejected from the liquid target generator 172, and in liquid connection with the liquid target generator 172. The generated X-ray radiation 176 may exit the X-ray source 170 via transmission through an X-ray transparent window 184.

As illustrated in FIG. 7, the electromagnetic pump 100 can be arranged inside the vacuum chamber 178 in comparatively close proximity to the electron source 176. Hence, it may be advantageous to take measures so that the pump does not interfere magnetically with the electron beam. An embodiment that takes this into account will be discussed with reference to FIG. 8.

Figure 8:
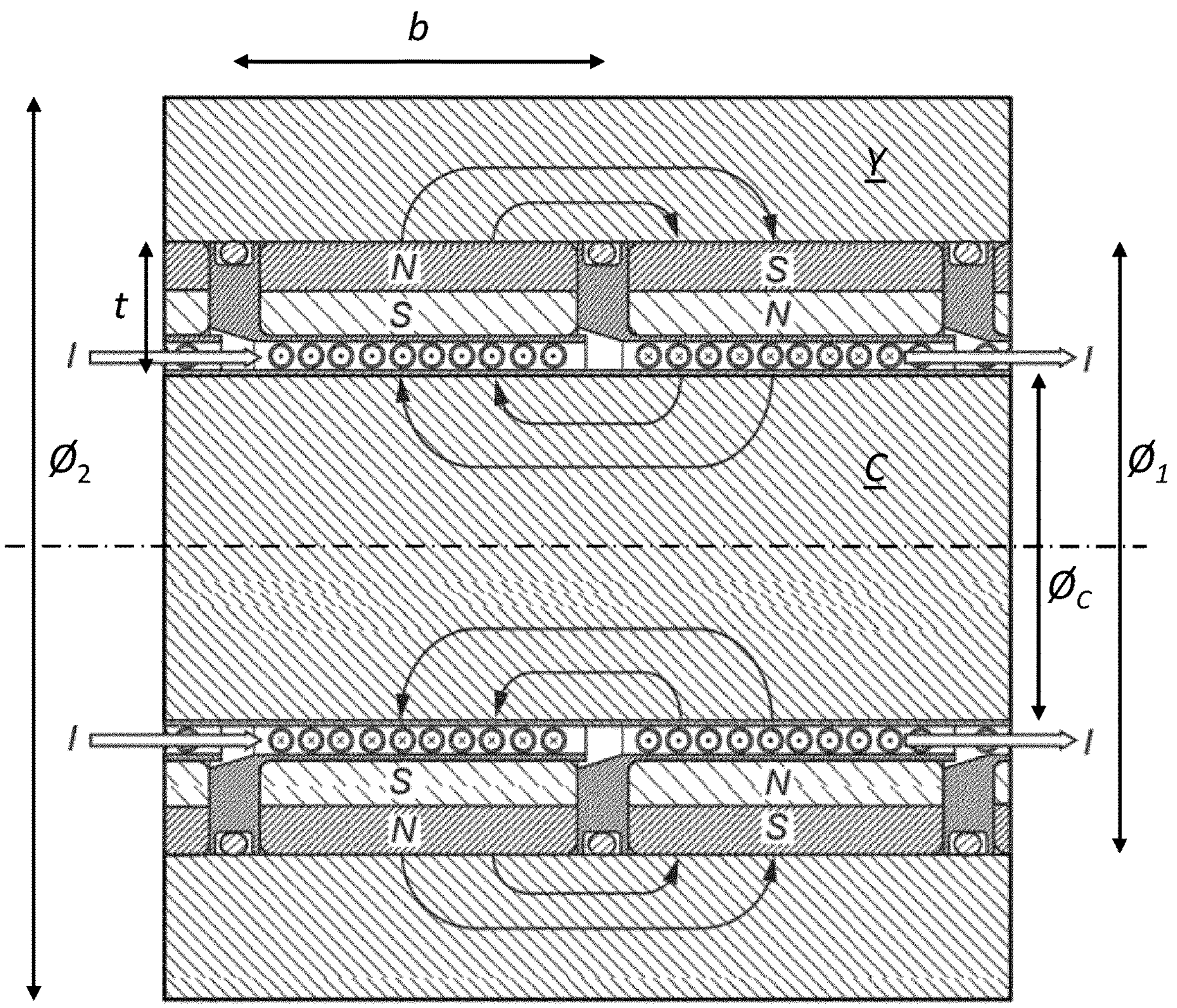
FIG. 8 schematically illustrates core and yoke geometries of an embodiment.

A schematic cross-sectional view of two sections of an electromagnetic pump according to the present disclosure is shown in FIG. 8. FIG. 8 is similar to FIG. 3 and the same reference numerals are used in this discussion. However, in order not to clutter the view, some reference numerals are omitted in FIG. 8. The liquid metal is transported in tubes, e.g. thin-walled stainless steel tubes, that are wound around a central core. The flow direction of liquid metal in the tubes is indicated by points (flow out from the plane of the view) and crosses (flow into the plane of the view).

In some embodiments, liquid can also be allowed to flow outside the tubes, thereby reducing the pressure difference across the tube wall. More generally, the tubes (i.e. the conduits for the liquid metal) may be immersed or embedded in an incompressible medium. Such incompressible medium may be a parallel flow of the same liquid metal as inside the tubes, or it may be another liquid that is separated from the liquid metal inside the tubes. It is also conceivable that the incompressible medium is, for example, an incompressible potting compound such as an epoxy. The incompressible medium may also provide electrical connection between adjacent tube walls.

In order to maximize the magnetic field through the liquid metal and thereby maximizing the pumping power, the inner core C and the outer yoke Y are preferably made from a ferromagnetic material. Both the core and the outer yoke can thus comprise iron, magnetic steel, or the like. In the embodiment of FIG. 8, the magnetic field generators are permanent magnets which are arranged between the core and the yoke. Permanent magnets can be advantageous since no electrical feed-throughs are required for generation of the magnetic field, which enables a less complex design.

The length of one section is indicated by the arrow b in FIG. 8. A permanent magnet is located in each section, as illustrated in the figure. The length b of one segment is limited by the saturation magnetization of the (iron) core. If a circular symmetry is assumed (which may be typical), this condition can be written as $$\pi\phi_C\frac{b}{2}B \le \frac{\pi\phi_C^2}{4}B_S$$

which can be re-written as $$b \le \frac{\phi_C}{2}\frac{B_S}{B}$$

where B is the magnetic field strength provided by the magnets, $B_s$ is the saturation magnetization of the (iron) core, and $\varnothing_C$ is the diameter of the core.

A corresponding argument for the outer yoke Y gives a minimum thickness of the yoke in order to contain the magnetic field. Again, for circular symmetry with an inner diameter of the yoke being $\varnothing_1$ and an outer diameter of the yoke being $\varnothing_2$, the following condition applies $$\pi\phi_1\frac{b}{2}B \le \frac{\pi(\phi_2^2-\phi_1^2)}{4}B_S$$

which can be re-written as $$\phi_1^2+\phi_1\frac{2b}{B_S}B \le \phi_2^2$$

By inserting the upper limit for b from above, which corresponds to utilizing the largest possible magnetic flux in the core, this expression reduces to $$\varnothing_2^2 \ge \varnothing_1^2+\varnothing_1\varnothing_C$$

and for the limiting case where the inner diameter of the yoke approaches the diameter of the core, this reduces further to $$\varnothing_2 \ge \sqrt{2}\varnothing_C$$

Thus, the thickness of the yoke may, in the same limit, be written as $$\frac{\phi_2-\phi_1}{2} > \frac{\sqrt{2}-1}{2}\phi_C \approx 0.2\phi_C$$

It can be understood that the thickness of the yoke should be at least 20% of the core diameter. In many embodiments, the magnets will have a non-negligible thickness and a gap is required between the core and the yoke to make room for the tube that carries the liquid metal. If the radial distance from the outside of the core to the inside of the yoke is denoted t, then the following applies.

$$\varnothing_1=\varnothing_C+2t$$

and thus $$\varnothing_2^2 \ge (\varnothing_C+2t)^2+(\varnothing_C+2t)\varnothing_C$$

which can be re-written as $$\varnothing_2 \ge \sqrt{2\varnothing_C^2+6\varnothing_C t+4t^2}$$

In the limit where t is small (i.e. thin magnets and a narrow gap), this last inequality can be approximated as $$\phi_2 \ge \sqrt{2}\,\phi_C+\frac{3t}{\sqrt{2}}$$

and in this limit, the thickness of the yoke can thus be written as $$\frac{\phi_2-\phi_1}{2} > \frac{\sqrt{2}-1}{2}\phi_C+\frac{3-2\sqrt{2}}{2\sqrt{2}}t \approx 0.2\phi_C+0.06t$$

Hence, in a preferred embodiment the outer yoke has a thickness of at least 20% of the core thickness plus 6% of the radial distance between the outside of the core and the inside of the yoke.

Embodiments in which the thickness of the outer yoke is at least 20% of the core diameter, or preferably at least 20% of the core diameter plus 6% of the radial distance between the core and the yoke, as described above thus have the advantage that magnetic leakage is prevented or at least drastically reduced, and interference with the electron beam is thereby eliminated or at least drastically reduced. A thick outer yoke also has the additional advantage that it may sustain a higher pressure in and around the tube that carries the liquid metal.

In some embodiments of the present invention, it may also be preferred to consider the dimensions of the gap in the magnetic circuit. To avoid deterioration of performance at elevated temperatures, the gap in the magnetic circuit should be made as small as possible. However, making the gap smaller may decrease pump capacity. Considerations in this regard will be described below.

When designing an electromagnetic pump based on permanent magnets, the characteristics of the magnet material should be taken into account. Rare earth permanent magnets, in particular neodymium based, exhibit a reversible linear behavior over at least some parameter range. This makes them particularly suited for this kind of devices. However, when temperature is increased, the linear relation breaks down for high demagnetizing fields. This drawback may be avoided if the working point corresponds to a sufficiently high induced field. For rare earth magnets such as neodymium magnets, the magnitude of the induced field should generally be higher than the magnitude of the demagnetizing field, i.e. $B_m > -\mu_0 H_m$.

Figure 9:
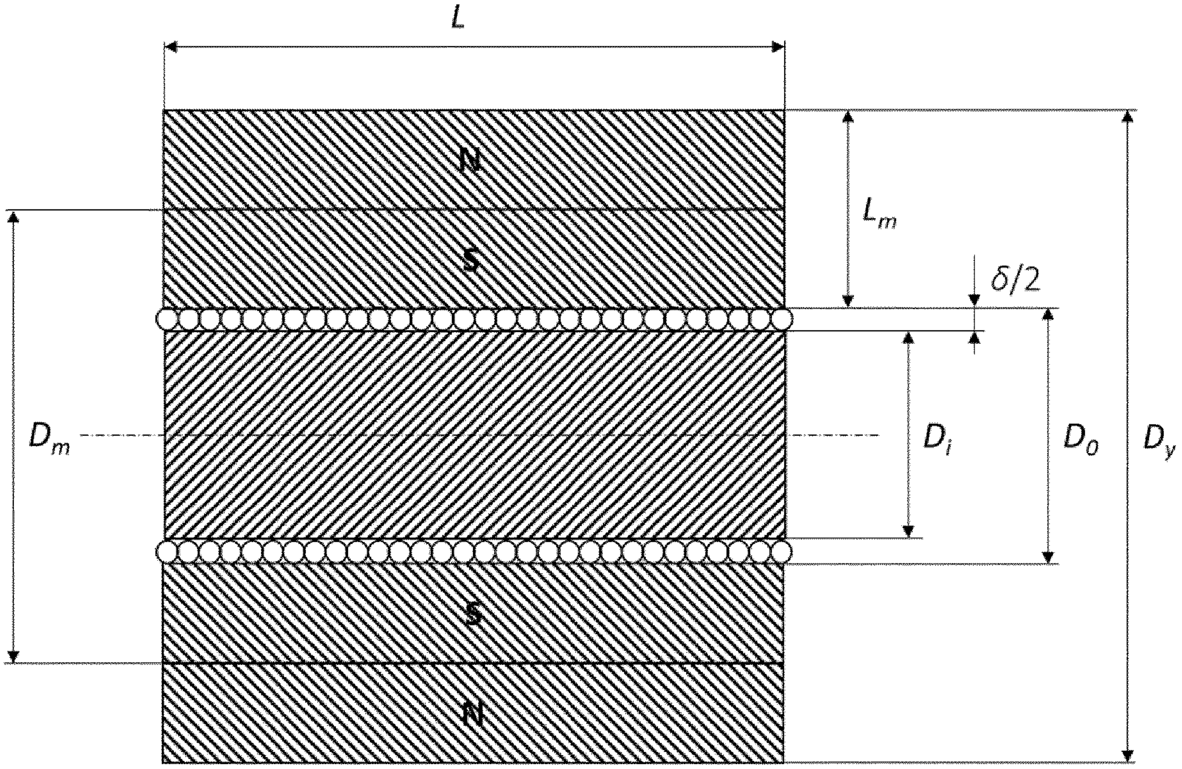
FIG. 9 is a cross sectional view illustrating dimensions and sizes of an embodiment.

With reference to FIG. 9, for a cylindrical geometry and with the assumption that no fields leak to the environment, the following expression can be set up $$\frac{B_m}{H_m} = -\frac{L_m P}{A_m}$$

where $B_m$ is the induced field, $H_m$ is the demagnetizing field, $L_m$ is the average length of the path in the magnet, $A_m$ is the average area of the magnet, and P is the external permeance, in this case the annulus between the cylindrical magnet and the core. By setting the relative permeability in the annulus to 1, magnet length to L, outer diameter of the magnet to $D_y$, inner diameter of the magnet to $D_0$, and diameter of the core to $D_i$, the following expression is obtained $$\frac{B_m}{\mu_0 H_m} = -\frac{L_m}{A_m}\frac{2\pi L}{\ln\left(\frac{D_0}{D_i}\right)} = -\frac{2\pi L L_m}{\pi D_m L \ln\left(\frac{D_0}{D_i}\right)} = -\frac{2\left(\frac{D_y - D_0}{2}\right)}{\left(\frac{D_y + D_0}{2}\right)\ln\left(\frac{D_0}{D_i}\right)}$$

where $D_m$ represents the average magnet diameter. The above-mentioned condition $B_m > -\mu_0 H_m$ can thus be written as $$\frac{2(D_y - D_0)}{(D_y + D_0)\ln\left(\frac{D_0}{D_i}\right)} > 1$$

By setting the gap between the core and the magnet to δ/2, the above inequality can be re-written as $$\frac{D_y - D_0}{(D_y + D_0)\ln\left(1 + \frac{\delta}{D_i}\right)} > \frac{1}{2}$$

Under the assumption that the gap is small compared to the diameter of the core, this can be approximated to $$\frac{D_y - D_0}{(D_y + D_0)\frac{\delta}{D_i}} > \frac{1}{2}$$

which can be rearranged to $$\frac{\delta}{2} < \frac{(D_y - D_0)D_i}{(D_y + D_0)}$$

FIG. 9 illustrates the measures used in the expressions above, and also indicates a helical conduit provided inside the annular space between the magnet and the core. As will be understood, an actual embodiment will also include a yoke to complete the magnetic circuit, but such yoke is not shown in FIG. 9 for reasons of clarity. Embodiments with multiple sections having alternating polarity of the magnets and the winding directions of the conduits may be used to achieve the desired pump performance. In FIG. 9, the magnet is shown as a single radially magnetized hollow cylinder, but it may alternatively comprise a plurality of arc shaped magnets assembled to achieve a cylindrical configuration.

The pressure drop over the conduit decreases rapidly (to the fourth power) with increased diameter of the conduit. This would encourage implementations where the diameter of the conduit, and hence the gap in the magnetic circuit, is made large. However, the effective magnetic field will also decrease as the gap is made larger, thus making the pump less efficient. The decrease in magnetic field is a relatively weak function of the gap size. A preferred embodiment would have a gap size close to the limit δ/2 derived above.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

LIST OF REFERENCE SIGNS

A Main axis
b Segment length
C Core
I Electric current
M Main flow direction
N Magnetic north pole
S Magnetic south pole
$S_1$ Single plane
$S_2$ Single plane
t Radial distance between core and yoke
Y Yoke
$Ø_C$ Core diameter
$Ø_1$ Inner yoke diameter
$Ø_2$ Outer yoke diameter
100 Electromagnetic pump
102 First conduit section
104 Second conduit section
106 Conduit section
108 Conduit section
110 Inlet
111 Inlet side
112 Outlet
113 Outlet side
114 Inlet
115 Inlet side
116 Outlet
120 Current generator
122 Magnetic field generating arrangement
124 Main inlet
126 Main outlet
128 Yoke

129 Core
130 End piece
132 End piece
136 Lid
138 Lid
140 First coil
142 Second coil
144 Flow direction
145 Flow direction
146 Flow direction
147 Flow direction
148 First magnetic field generator
150 Second magnetic field generator
152 Type one magnetic pole
154 Type two magnetic pole
156 Intermediate reservoir"
158 Outer wall
160 First diameter
161 First coil diameter
162 Intermediate conducting element
163 Second diameter
164 Outer electric current conductor
165 Second coil diameter
166 Inner electric current conductor
170 X-ray source
172 Liquid target generator
174 Liquid target
176 Electron source
177 X-ray radiation
178 Low pressure chamber/Vacuum chamber
180 Recirculating path
182 Collection reservoir
184 X-ray transparent window

The invention claimed is:

1. A liquid metal jet X-ray source, comprising:

a nozzle for providing a liquid metal jet;

an electron source for providing an electron beam to interact with the liquid metal jet such that X-ray radiation is generated;

an electromagnetic pump for providing liquid metal to the nozzle;

wherein the electromagnetic pump comprises a core having a first diameter and an outer yoke with a thickness of at least 20% of said first diameter.

2. The liquid metal jet X-ray source of claim 1, wherein there is a distance between an outer periphery of said core and an inner periphery of said outer yoke, and wherein the thickness of the outer yoke is at least 20% of said first diameter plus 6% of said distance.

3. The liquid metal jet X-ray source of claim 1, wherein said core and said outer yoke comprise iron or magnetic steel.

4. The liquid metal jet X-ray source of claim 1, further comprising a collector for collecting material forming the liquid metal jet and transporting it to an inlet of the electromagnetic pump.

5. The liquid metal jet X-ray source of claim 1, wherein the electromagnetic pump comprises:

a conduit arranged in windings around said core for transporting the liquid metal from an inlet to an outlet;

a permanent magnet, arranged concentrically with said core, providing a radial magnetic field through said conduit;

a current source for providing an electrical current through the conduit in an axial direction along said core and substantially perpendicular to said magnetic field.

6. The liquid metal jet X-ray source of claim 5, comprising at least a first and a second segment along an axial direction of said core, wherein a first permanent magnet is arranged in the first segment and a second permanent magnet is arranged in the second segment, said first and second permanent magnets being arranged with opposite magnetic field orientations, and wherein the conduit winding direction in said first segment is opposite to the conduit winding direction in said second segment.

7. The liquid metal jet X-ray source of claim 5, wherein liquid metal is allowed to flow both inside and outside of a wall of said conduit.

8. The liquid metal jet X-ray source of claim 5, wherein said conduit is immersed in an incompressible medium.

9. The liquid metal jet X-ray source of claim 5, wherein said conduit is made from a non-magnetic material.

10. The liquid metal jet X-ray source of claim 1, wherein the electromagnetic pump is configured to provide liquid metal to said nozzle at a pressure of at least 100 bar.

11. The liquid metal jet X-ray source of claim 1, wherein said X-ray source is arranged to provide the liquid metal jet as a freely propagating jet from said nozzle.

12. The liquid metal jet X-ray source of claim 1, further comprising a vacuum chamber, wherein the nozzle, the electron source, and the electromagnetic pump are comprised within the vacuum chamber.

* * * * *